United States Patent
Clemens

[11] 3,709,612
[45] Jan. 9, 1973

[54] APPARATUS FOR MEASURING REFLECTED LIGHT UNDER STABILIZED LIGHT SOURCE CONDITIONS

[75] Inventor: Anton Hubert Clemens, Elkhart, Ind.

[73] Assignee: Miles Laboratories, Inc., Elkhart, Ind.

[22] Filed: March 10, 1971

[21] Appl. No.: 122,747

[52] U.S. Cl. .................356/178, 356/186, 356/195, 250/205, 250/227
[51] Int. Cl. ..............................................G01j 3/50
[58] Field of Search.............356/178, 186, 195, 212; 250/205, 227

[56] References Cited

UNITED STATES PATENTS

| | | | |
|---|---|---|---|
| 3,614,450 | 10/1971 | Hill et al. | 250/205 X |
| 3,327,584 | 6/1967 | Kissinger | 356/212 X |
| 3,413,481 | 11/1968 | Berry | 356/186 X |
| 3,573,476 | 4/1971 | Falcoff et al. | 356/195 X |
| 3,594,086 | 7/1971 | Hughes et al. | 356/186 |
| 2,306,073 | 12/1942 | Metcalf | 250/205 X |
| 3,215,843 | 11/1965 | Neil | 250/205 |
| 3,437,822 | 4/1969 | Fitzsimmons | 250/205 X |
| 3,532,434 | 10/1970 | Jones, Jr. et al. | 356/178 |
| 3,582,661 | 6/1971 | Pijls | 250/205 X |

FOREIGN PATENTS OR APPLICATIONS

| 36,785 | 2/1965 | Germany | 356/178 |
|---|---|---|---|

*Primary Examiner*—Ronald L. Wibert
*Assistant Examiner*—J. Rothenberg
*Attorney*—Joseph C. Schwalbach, Louis E. Davidson, Harry T. Stephenson and George R. Caruso

[57] ABSTRACT

Apparatus is described for simultaneously detecting light reflected from a color reflectance surface at two different wavelength ranges wherein the reflected light detected at one wavelength range is employed to stabilize the light output of the light source directed at such reflectance surface and the reflected light detected at another wavelength range is employed to measure specific characteristics of the reflectance surface.

1 Claim, 2 Drawing Figures

INVENTOR
ANTON HUBERT CLEMENS
BY Louis E. Davidson
ATTORNEY 3,709,612

APPARATUS FOR MEASURING REFLECTED LIGHT UNDER STABILIZED LIGHT SOURCE CONDITIONS

BACKGROUND AND PRIOR ART

It is known in the art that reflected light from a color reflectance surface can be measured by various photosensitive means. A typical color reflectance surface employed in this manner is a pH indicator comprising a bibulous carrier containing a reagent system that changes color depending on the pH of a liquid sample brought into contact with said reagent system. It is also known that it is difficult to obtain an accurate instrument readout of such reflected light, especially when such reflected light must be employed to distinguish specific differences in characteristics of the reflectance surface. Such a problem exists when the reflectance surface changes color depending on the pH, for example, of the liquid sample with which it is contacted and the reflectance instrument is employed to measure the specific pH value based on the particular color reflectance. A difference in reflected light might be detected and indicated as a difference in pH, for example, when the pH actually remained the same but other variations existed in the light source or the geometry of the system, for example. The prior art has attempted to overcome these difficulties by carefully controlling the geometry of the reflectance measurement system, by complex light source stabilization and by careful calibration of the reflectance detecting system prior to each individual measurement. While such prior art apparatus and methods were somewhat suitable to overcome single variations, such as variations in light source output or variations in optical geometry, they were not suitable to overcome multiple variations which can occur simultaneously or sequentially. Such multiple variations can occur when a large number of separate color reflectance surfaces are being rapidly and automatically measured, such as reagent systems for measuring pH of a large number of biological samples.

SUMMARY OF THE INVENTION

In accordance with the present invention, apparatus is provided for quantitative photometric measurement of color reflectance values from a color reflectance surface which comprises a polychromic light source capable of directing polychromic light on a color reflectance surface, a first sensing means capable of sensing light having a first selected wavelength range reflected from such color reflectance surface, a second sensing means capable of sensing light having a second selected wavelength range reflected from such color reflectance surface, said first sensing means being connected to said light source, and means for adjusting the output of said light source in response to a change in the light sensed by said first sensing means so that a substantially constant reflected light at said first selected wavelength range is sensed by said first sensing means, the reflectance values sensed by said second sensing means thereby being directly related to specific characteristic reflectances of said color reflectance surface.

DESCRIPTION OF THE INVENTION

Figure 1:
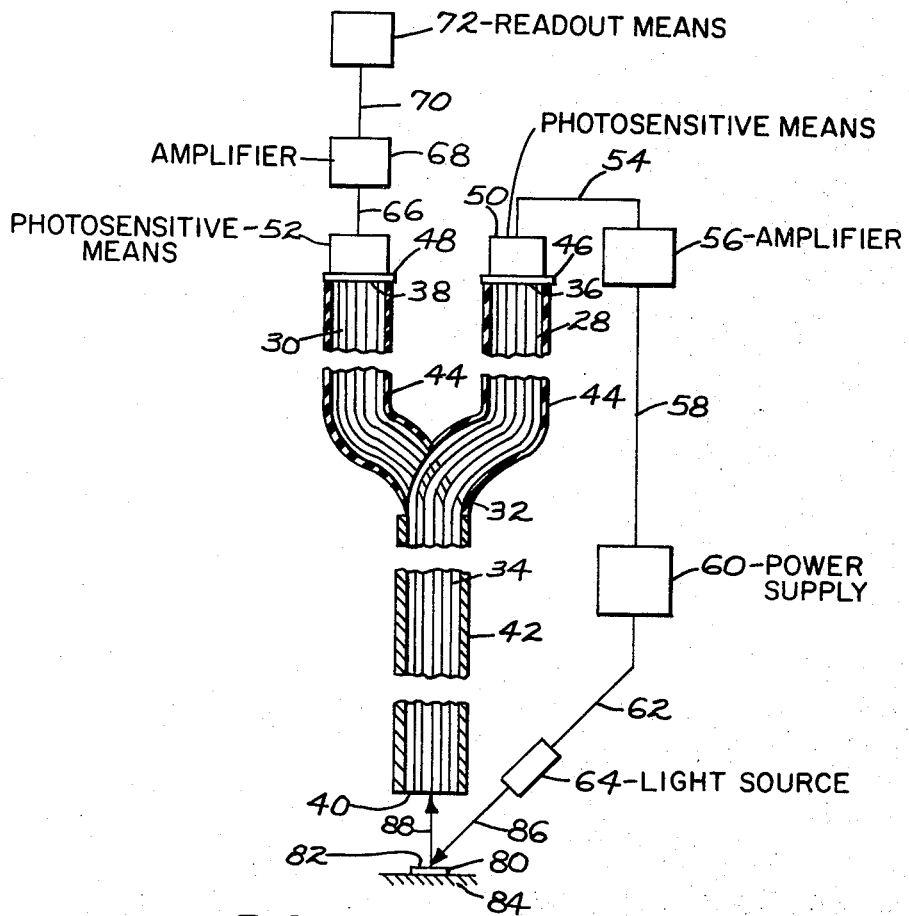
FIG. 1 shows apparatus of the present invention in partial vertical cross-section and in partial block diagram.

Referring to FIG. 1 illustrating a preferred form of the apparatus of the present invention, a bundle of optical fibers 28 and a separate bundle of optical fibers 30 are uniformly intermixed at 32 to form a single overall bundle of optical fibers 34. Bundle 28 has a generally flat end face 36, bundle 30 has a generally flat end face 38, and bundle 34 has a generally flat end face 40. Bundle 34 is surrounded by an opaque tube 42 and bundles 28 and 30 are surrounded by an opaque layer 44.

A filter 46 having a maximum transmission at a selected wavelength range is placed adjacent to end face 36 of bundle 28 and a filter 48 having a maximum transmission at a different selected wavelength range is placed adjacent to end face 38 of bundle 30. A first photosensitive sensing means 50, such as a photoconductor, is placed adjacent to first filter means 46 so that it senses light from bundle 28 transmitted through filter 46. A second photosensitive sensing means 52, such as a photoconductor, is placed adjacent to second filter means 48 so that it senses light from bundle 30 transmitted through filter 48.

First sensing means 50 is connected through line 54 to amplifier 56. The amplified signal from amplifier 56 is connected through line 58 to power supply 60. The output from power supply 60 is connected through line 62 to polychromic light source 64.

Second sensing means 52 is connected through line 66 to amplifier 68. The amplified signal from amplifier 68 is connected through line 70 to a readout means 72. This readout means can be a meter, a digital indicator, a printer, or a computer storage bank where the signal information can be stored for subsequent use. Such readout means provides an indication of the desired specific characteristic of a color reflectance surface, as will hereafter appear.

Figure 2:
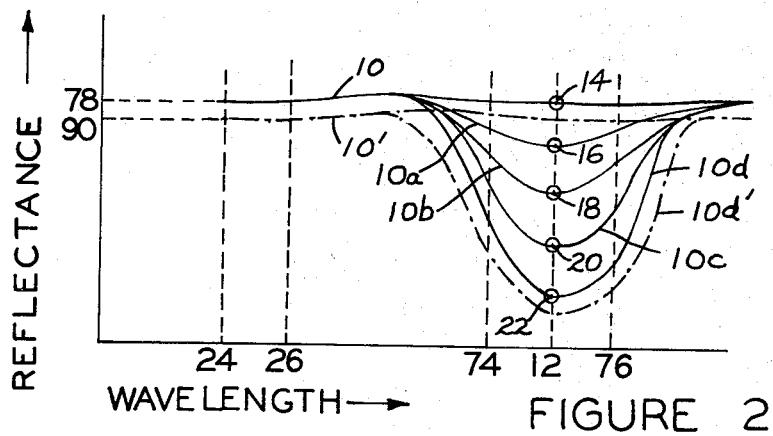
FIG. 2 shows a family of curves representative of reflectance values from a color reflectance surface.

Referring to FIG. 2, a family of curves 10, 10a, 10b, 10c and 10d shown in solid lines represent typical reflectance values from a color reflectance surface plotted as reflectance versus wavelength. Such a family of curves can be produced by reflectance from a bibulous carrier impregnated with a reagent system sensitive to pH, for example, and wherein the changes of color caused by changes in pH result in changes in the reflectance values represented by the differences in peaks of curves 10, 10a, 10b, 10c and 10d. This is well known and reflectance instruments are available for reading such differences in reflectance values.

In order to have a quantitative measurement of such reflectance characteristics, there must be a baseline against which reflectance values are compared. In FIG. 2, curve 10 can provide such baseline and the absolute reflectance 14 of curve 10 at wavelength 12 can represent a specific quantitative value of pH. The corresponding absolute reflectance values 16, 18, 20 and 22 of curves 10a, 10b, 10c and 10d, respectively, at the same wavelength can then represent specific different quantitative values of pH. However, if the intensity of the light source directed at the color reflectance surface varies or if the geometry of the reflectance measurement system varies, such variations can cause the family of curves to shift to a different position shown, for example, by the dashed and dotted lines 10' and 10d'. An absolute reflectance measurement under these conditions would provide incorrect quantitative values of pH since the new reflectance values for 10' and 10d' would represent pH characteristics having different specific reflectance values. As mentioned above, the prior art has attempted to overcome this problem by independently stabilizing the total light output from the light source or by stabilizing the geometry of the reflectance system. Such techniques are complex and expensive and do not overcome multiple variations.

In the apparatus of the present invention, first filter means 46 employed with first sensing means 50 has a maximum transmission at the first wavelength range selected between 24 and 26 shown in FIG. 2. Second filter means 48 employed with second sensing means 52 has a maximum transmission at the second wavelength range selected between 74 and 76 shown in FIG. 2. The wavelength range between 74 and 76 is selected at values which are critical for the specific reflectance characteristic being measured. The wavelength range between 24 and 26 is selected at values which are not critical for such specific characteristic.

When the above apparatus is employed to measure reflectance values, it is positioned above an object 80 having a color reflectance surface 82. The object 80 is positioned on a support 84 so that the optical axis 86 of the polychromic light from light source 64 impinges on surface 82 at an angle of 45° to the plane of surface 82. Bundle 34 of optical fibers is placed so that the optical axis 88 of the fibers of such bundle is normal to surface 82. This angular relationship between the light source, reflectance surface and reflectance optical fibers results in maximum detection of spectral reflectance.

Reflected light from surface 82 is transmitted through bundle 28 to first sensing means 50. Since the fibers of bundle 28 are uniformly distributed through bundle 34, first sensing means 50 is exposed to reflected light over the entire end face 40. The control signal entering power supply 60 from first sensing means 50 controls the light output from light source 64 so that the integrated reflectance within wavelengths 24 and 26 is stabilized at reflectance value 78, for example. If there is relative movement between end face 40 of bundle 34 and surface 82, for example, or relative movement between light source 64 and surface 82, or if the output from light source 64 should vary because of fluctuations in line voltage or light source characteristics, the family of curves shown in FIG. 1 might shift downward, for example, from the solid lines to the dashed and dotted lines. The reflected light being sensed by first sensing means 50 would tend to decrease to value 90, for example. The resulting output signal from first sensing means 50 to power supply 60 would quickly adjust the light output from light source 64 so as to increase the reflectance sensed by first sensing means 50 to the desired value represented by 78. A reverse operation would occur to decrease the light source output in the event that the reflectance sensed by first sensing means 50 would rise above value 78. A substantially constant reflected light at the first selected wavelength range is thus sensed by the first sensing means 50. As a result, the various reflectance values sensed by second sensing means 52 in the wavelength range from 74 to 76 will not vary because of changes in optical geometry or light source output. Since the fibers of bundle 30 are uniformly distributed through bundle 34, second sensing means 52 is exposed to reflected light over the entire end face 40.

The various reflectance values sensed by second sensing means 52 can therefore be directly calibrated and related to specific reflectance characteristics of color reflectance surface 82, such as the various colors resulting from different pH values, and a given reflectance value sensed by second sensing means 52 will always refer to the same characteristic, irrespective of variations in optical geometry or power line fluctuations. The use in the present invention of reflectance in a specific wavelength range to stabilize the light source output is more accurate for measurement of color reflectance differences than the usual prior art light source stabilization wherein the integrated total light output is stabilized.

Optical fibers suitable for use in the present invention can be chosen from any of the conventional optical fibers now available, such as glass fibers generally having a high refractive index center and a low refractive index surrounding portion. Other fibers, such as those made of plastic, are also suitable. A bundle of fibers may be formed by using plastic or glass fibers of high refractive index embedded in a filler of low refractive index such as a thermosetting resin.

What is claimed is:

1. Apparatus for quantitative photometric measurement of color reflectance values from a color reflectance surface which comprises in combination a polychromic light source positioned so as to direct polychromic light on such color reflectance surface, a first bundle of optical fibers having a light entrance end and a light exit end, a second bundle of optical fibers having a light entrance end and a light exit end, the portions of the first and second bundles of optical fibers near their light entrance ends being uniformly intermixed with all the fibers substantially parallel to form a single bundle of optical fibers, said single bundle having its light entrance end positioned near said color reflectance surface, a first filter means having maximum light transmission at a first selected wavelength range positioned adjacent to the light exit end of said first bundle of optical fibers, a first photosensitive means positioned adjacent to said first filter means to detect light transmitted through said first filter means, a second filter means having maximum light transmission at a second selected wavelength range positioned adjacent to the light exit end of said second bundle of optical fibers, a second photosensitive means positioned adjacent to said second filter means to detect light transmitted through said second filter means, a first amplifier connected to said first photosensitive means, a power supply connected to said first amplifier and to said polychromic light source, a second amplifier connected to said second photosensitive means and a readout means connected to said second amplifier, said first photosensitive means in combination with said power supply adjusting the output of said light source in response to a change in the reflected light from said color reflectance surface being sensed by said first photosensitive means so that a substantially constant reflected light at said first selected wavelength range is sensed by said first photosensitive means, the reflectance values from said color reflectance surface at the second selected wavelength range sensed by said second photosensitive means and indicated by said readout means thereby being directly related to specific characteristic reflectances of said color reflectance surface.

* * * * *